US011134625B2

(12) United States Patent
Niquet

(10) Patent No.: US 11,134,625 B2
(45) Date of Patent: Oct. 5, 2021

(54) IRRIGATION EMISSION DEVICE BARB

(71) Applicant: The Toro Company, Bloomington, MN (US)

(72) Inventor: Luis Robert Niquet, Temecula, CA (US)

(73) Assignee: The Toro Company, Bloomington, MN (US)

( * ) Notice: Subject to any disclaimer, the term of this patent is extended or adjusted under 35 U.S.C. 154(b) by 214 days.

(21) Appl. No.: 16/395,951

(22) Filed: Apr. 26, 2019

(65) Prior Publication Data

US 2019/0327918 A1 Oct. 31, 2019

Related U.S. Application Data

(60) Provisional application No. 62/663,454, filed on Apr. 27, 2018.

(51) Int. Cl.
*A01G 25/02* (2006.01)
*B05B 15/62* (2018.01)
*F16L 55/07* (2006.01)

(52) U.S. Cl.
CPC .............. *A01G 25/02* (2013.01); *B05B 15/62* (2018.02); *F16L 55/07* (2013.01)

(58) Field of Classification Search
CPC .... A01G 25/02; A01G 25/023; A01G 25/026; B05B 15/62; F16L 55/07
USPC .................................................. 239/272, 542
See application file for complete search history.

(56) References Cited

U.S. PATENT DOCUMENTS

| 4,190,206 A * | 2/1980 | Atkinson ............. A01G 25/023 239/271 |
| 5,443,212 A | 8/1995 | Dinur |
| 5,820,028 A | 10/1998 | Dinur |
| 2014/0263758 A1 | 9/2014 | Turk |
| 2017/0290277 A1 | 10/2017 | Cohen |

\* cited by examiner

*Primary Examiner* — Christopher S Kim
(74) *Attorney, Agent, or Firm* — Dicke, Billig & Czaja, PLLC

(57) ABSTRACT

An irrigation emission device includes a barb that is self-piercing, and the irrigation emission device may be installed either manually or with the use of a piercing or insertion tool. In any event, the barb assists in making installation easier by piercing the hose to insert a portion of the device through the hose. Preferably, the barb will not pierce an opposing wall of the hose during installation.

19 Claims, 4 Drawing Sheets

IRRIGATION EMISSION DEVICE BARB

This application claims the benefit of U.S. Provisional Patent Application 62/663,454, filed Apr. 27, 2018, which is incorporated by reference herein.

BACKGROUND

An irrigation emission device is operatively connected to an irrigation hose to supply fluid from the hose's fluid passageway to the hose's external environment. An external irrigation emission device may be installed in the field, and to ease in its installation, a barb is used to pierce the hose and insert a portion of the device through the hose.

SUMMARY

An irrigation emission device includes a barb that is self-piercing, and the irrigation emission device may be installed either manually or with the use of a piercing tool or an insertion tool. In any event, the barb assists in making installation easier by piercing the hose to insert a portion of the device through the hose. Preferably, the barb will not pierce an opposing wall of the hose during installation.

An irrigation emission device barb comprises a piercing portion and an inlet. The piercing portion has a first side, a second side, a first end, and a second end forming a generally rectangular shape. A first taper is proximate the first end, a second taper is proximate the second end, and a third taper extends along the first side and the second side from proximate the first end to the second end forming a tip proximate a distal end. The first, second, and third tapers have different angles. The inlet has an inlet aperture.

DETAILED DESCRIPTION

Figure 1:
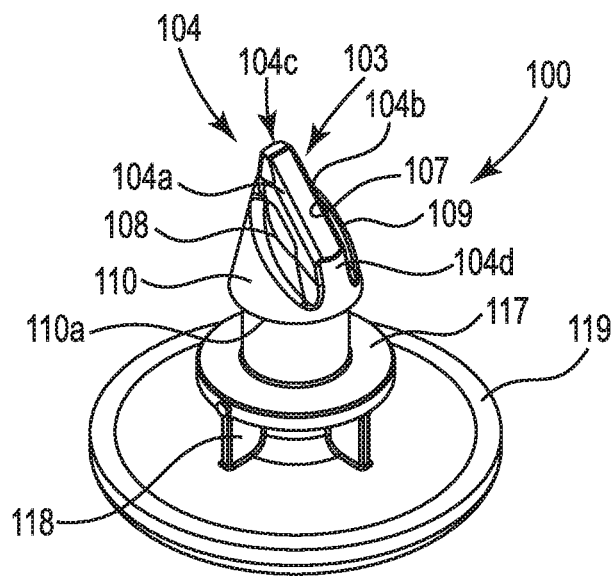
FIG. 1 is a bottom perspective view of a barb operatively connected to an irrigation emission device constructed in accordance with the principles of the present invention.
Figure 2:
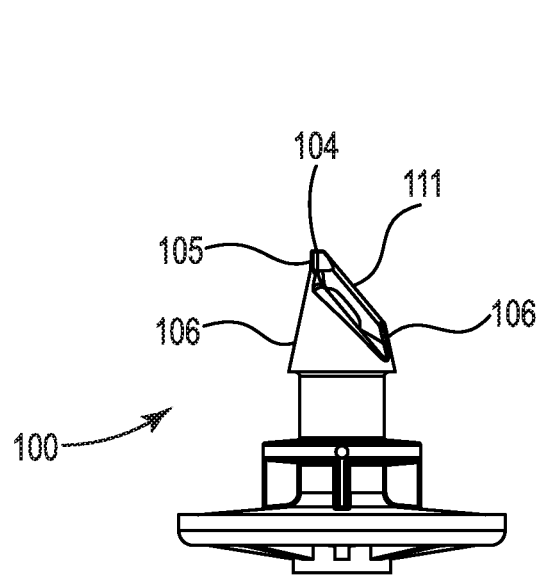
FIG. 2 is a side view of the barb operatively connected to the irrigation emission device shown in FIG. 1.

In the following Detailed Description, reference is made to the accompanying drawings which form a part hereof, and in which is shown by way of illustration embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

An embodiment irrigation emission device 100 generally includes an internal portion 101 and an external portion 116, the internal portion 101 being positioned within a fluid passageway 126 of an irrigation hose 124 and the external portion 116 being positioned proximate an external surface 125b of the irrigation hose 124 when installed on the irrigation hose 124. The irrigation hose 124 includes a wall 125 with an internal surface 125a forming the fluid passageway 126 and an external surface 125b.

The internal portion 101 includes a barb 102 and an inlet 103 with an inlet aperture 107, which receives fluid from the fluid passageway 126. The barb 102 is generally cone shaped. In the orientation shown in FIG. 1, the bottom is a wider portion and the top is a tip of the general cone shape. Proximate the top, the barb 102 includes a piercing portion 104 that is generally rectangular and extends upward from a bottom portion 110.

Figure 3:
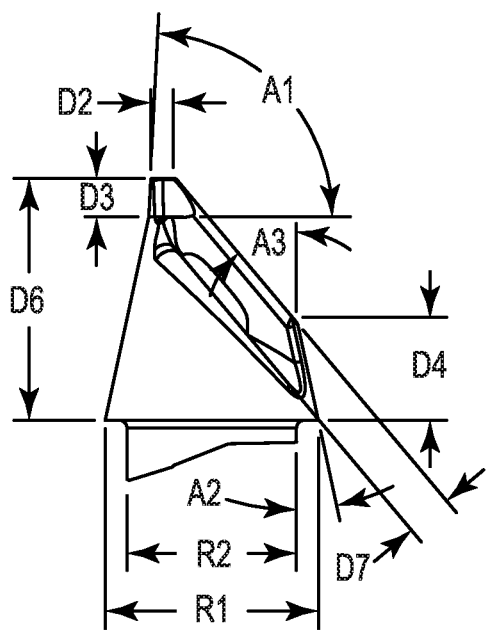
FIG. 3 is a portion of the barb shown in FIG. 2.

The piercing portion 104 includes a first side 104a, a second side 104b, a first end 104c, and a second end 104d forming the general rectangular shape. The first end 104c and the second end 104d are flush with the bottom portion 110. Proximate the first end 104c, the barb 102 has a first taper 105, and proximate the second end 104d, the barb 102 has a second taper 106. The second taper 106 generally forms a cone shape, and the first taper 105 extends from the second taper 106 at a different angle, as shown in FIG. 3. The piercing portion 104 has a third taper 111, tapering along the first side 104a and the second side 104b from the first end 104c to the second end 104d forming a tip proximate its distal end, the first end 104c. A first side ledge 108 extends outward from the bottom of the first side 104a and a second side ledge 109 extends outward from the bottom of the second side 104b of the piercing portion 104 to connect the piercing portion 104 to the bottom portion 110 of the barb 102. The bottom portion 110 forms a bottom ledge 110a. A neck 112 interconnects the internal portion 101 and the external portion 116. The neck 112 is generally cylindrical.

The external portion 116 includes gussets 118 interconnecting a flange 117 and a housing 119, which includes an outlet 120 in fluid communication with the inlet 103. Although the irrigation emission device 100 is shown and described as including an emitter as the external portion 116, it is recognized that any suitable irrigation emission device including, but not limited to emitters, foggers, micro-sprinklers, and misters could be used as the external portion 116.

Figure 5:
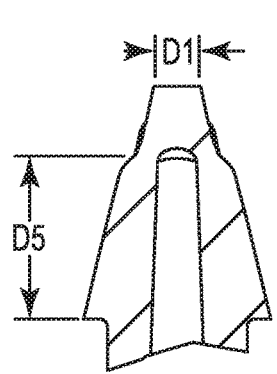
FIG. 5 is a portion of the barb shown in FIG. 4.
Figure 4:
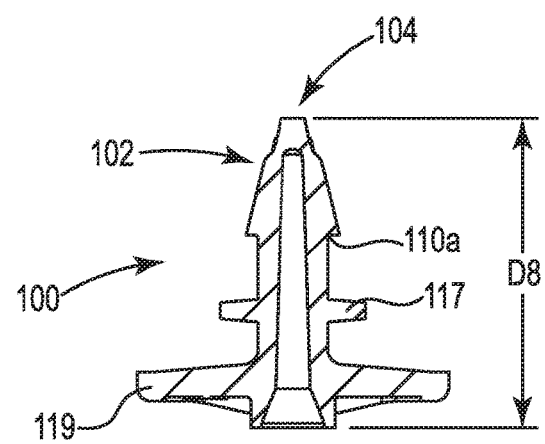
FIG. 4 is a side view of the barb operatively connected to the irrigation emission device shown in FIGS. 1 and 2 and rotated approximately ninety degrees from FIG. 2.
Figure 6:
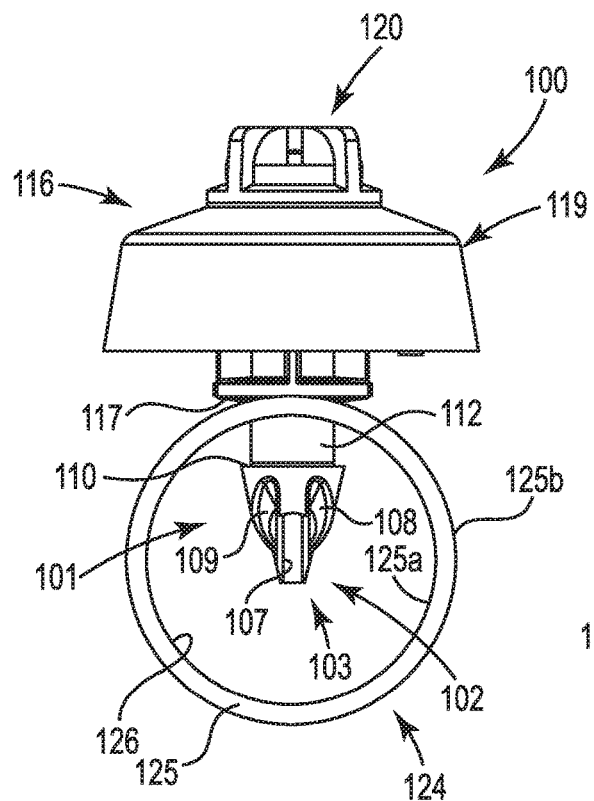
FIG. 6 is a side view of the barb operatively connected to the irrigation emission device shown in FIG. 1 installed on an irrigation hose.
Figure 7:
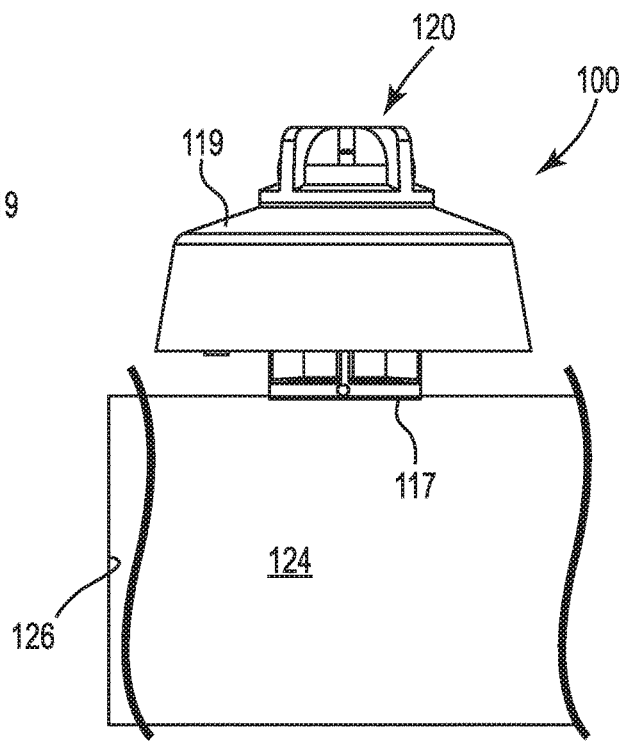
FIG. 7 is a side view of the barb operatively connected to the irrigation emission device shown in FIGS. 1 and 6 installed on the irrigation hose and rotated approximately ninety degrees from FIG. 6.

As shown in FIGS. 3-5, illustrating an example embodiment, the first taper 105 has an angle A1 that is approximately 87.0+/−2.0 degrees, the second taper 106 has an angle A2 that is approximately 12.1+/−3.0 degrees, and the third taper 111 has an angle A3 that is approximately 40.0+/−3.0 degrees. The tip (first end 104c) has dimensions D1 that is approximately 0.047+/−0.002 inch by D2 that is approximately 0.019+/−0.003 inch. Angles A1, A2, and A3 are generally the angles for the piercing portion 104, and the first and second ledges 108 and 109 are generally parallel to angle A3. The height of the top of the piercing portion 104, first taper 105, is dimension D3 that is approximately 0.040+/−0.005 inch, and the height of the bottom of the piercing portion 104 is dimension D7 that is approximately 0.047+/−0.002 inch. The inlet aperture 107 is approximately 0.070+/−0.005 inch by 0.150+/−0.005 inch. The distance from the second end 104d of the piercing portion 104 to the bottom ledge 110a is dimension D4 that is approximately 0.106+/−0.005 inch. From the first and second ledges 108 and 109 to the bottom ledge 110a is dimension D5 that is approximately 0.175+/−0.005 inch. From the tip (first end 104c) to the bottom ledge 110a is dimension D6 that is approximately 0.250+/−0.005 inch. The height of the irrigation emission device 100 is dimension D8 that is approximately 0.665+/−0.002 inch. The bottom ledge 110a has a radius R1 that is approximately 0.220+/−0.005 inch, and the neck 112 has a radius R2 that is approximately 0.175+/−0.005 inch.

Figure 10:
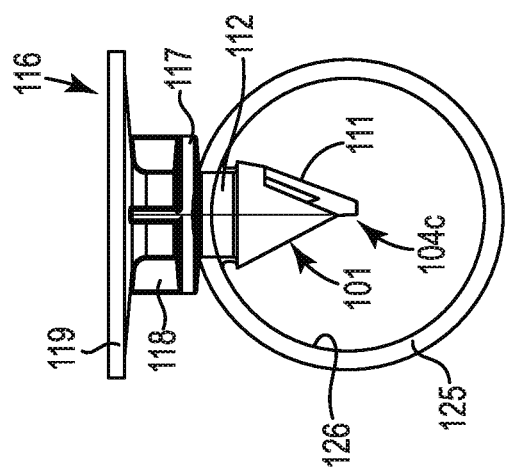
FIG. 10 illustrates the irrigation emission device installed on the irrigation hose.
Figure 9:
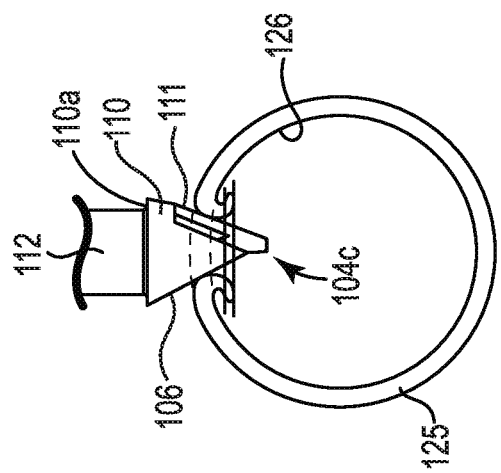
FIG. 9 illustrates initial penetration of the irrigation emission device and the irrigation hose during installation.
Figure 8:
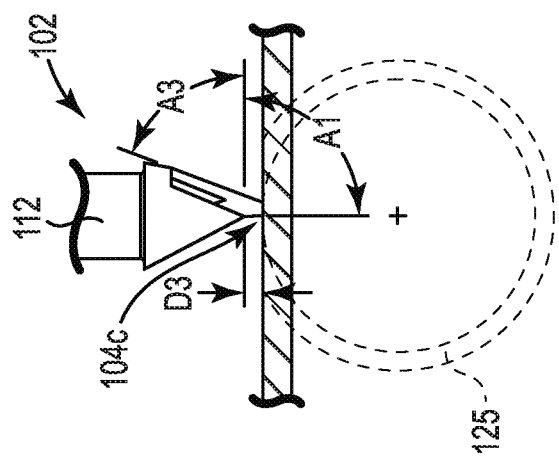
FIG. 8 illustrates initial contact of an irrigation emission device and an irrigation hose during installation.

To install the irrigation emission device 100 on an irrigation hose 124, as illustrated in FIGS. 8-10, the tip (first end 104c) of the piercing portion 104 is pressed against the hose wall 125, and the tip pierces the wall 125 to extend through the wall 125 and begins entering the fluid passageway 126. The distance D3 of the tip and the angle A1 generate a relatively high force to pierce and pry apart the resulting hole using the angle A1 as leverage. The second taper 106 and the third taper 111 assist in further prying apart the hole as the user continues to apply force, and the piercing portion 104 and the bottom portion 110 will move through the wall 125 until the internal portion 101 is positioned within the fluid passageway 126, the neck 112 extends through the wall 125, and the external portion 116 remains positioned externally to the hose 124. During piercing, the ledges 108 and 109 reduce friction to reduce the amount of energy required to pierce the wall 125. The flange 117 acts as a stop. The bottom ledge 110a of the internal portion 101 and the flange 117 of the external portion 116 assist in keeping the device 100 in proper position with the neck 112 extending through the wall 125 because they provide surfaces that cannot easily pass through the puncture in the wall 125. Alternatively, a piercing tool could be used to initially pierce the wall 125 before the barb 102 is inserted.

During installation, the barb 102 pierces one side of the wall 125 but does not pierce the opposing side of the wall 125. As the pushing force by the user increases, the amount of piercing deflection will also increase. Because the barb 102 geometry is generally a cone shape, the force will increase proportional to the increase of the area of the barb being used to pierce the wall. As the largest area of the cone, the bottom portion 110, passes the wall 125, the force drops substantially. The reduction in force left in the piercing process of one side of the wall 125 is not enough to puncture the other side of the wall 125. Approximately 20 to 22 pounds of force at a penetration rate of 1.0 inch per minute is used to pierce a hole in the one side of the wall 125, and after the barb 102 including the piercing portion 104 is inserted into the fluid passageway, the wall resists approximately 5 pounds of residual force. For a penetration rate of 2.0 inches per minute, approximately 10 pounds of force is used to pierce a hole in the one side of the wall 125.

Example 1

The example embodiment irrigation emission device illustrated in FIGS. 1-7, "Toro", and two other commercially available irrigation emission devices, "Competitor A" and "Competitor C", were tested to compare grit resistance performance.

All three emission devices were tested in a lab using a grit stand on the same day. The emission devices were tested by inserting or piercing each emitter into a plastic hose spaced 12 inches apart, similar to real-world application. The pressure was then turned on about 15-17 psi to run the water through the hose and through the emitters for taking flow rate readings on each of the emitters. That section of the test is called "Clean", see FIG. 11.

Figure 11:
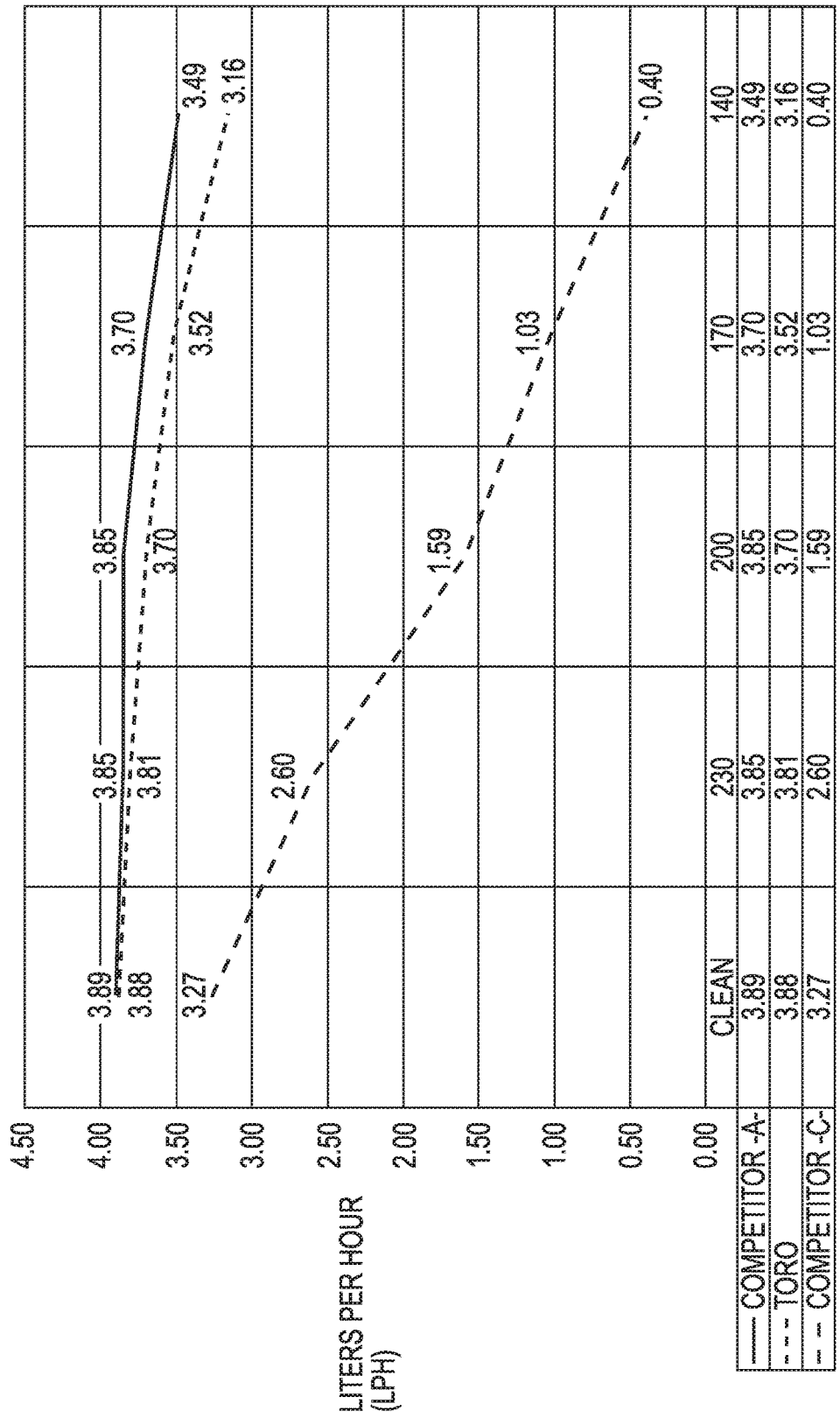
FIG. 11 is a graph illustrating filtration mesh size testing results of three different irrigation emission devices.

The grit quantity was then prepared for four (4) rounds, each round using a different size grit as shown in FIG. 11. The concentration mix for each round is 250 ppm. Each round is tested for about 30 minutes. The numbers below each test column indicate size of grit. For example, a 170 grit or a 140 grit represents a filtration mesh screen size representing the particle size. The grit size differential is used to help identify a filtration size capability of the emitter. Each emitter exhibits a level of susceptibility for clogging as shown in FIG. 11.

For these types of emission devices, there are no filtration requirements because the products are generally sold for commercial-residential use, which means the water quality is equivalent to human consumption after boiling, which is free from grit. However, as one way to test quality, this test was run to compare an embodiment against similar commercially available devices.

As shown in FIG. 11, the embodiment outperformed the Competitor C device and had a similar performance as the Competitor A device for the higher grit sizes.

A hypothesis as to why the embodiment performed well in the grit resistance testing is because the inlet slot is relatively long and narrow along an angle. The narrow aperture width prevents a lot of unwanted debris and grit from entering the inlet. This hypothesis is generally based on the grit resistance testing results for the Competitor C device, which had an inlet that was very large in the middle.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof

The invention claimed is:

1. An irrigation emission device barb, comprising:
a piercing portion configured and arranged to pierce an irrigation hose, the piercing portion having a first side, a second side, a first end, and a second end forming a generally rectangular shaped portion, the first end includes a first taper, a second taper forms a generally cone shaped portion between the first end and a bottom of the piercing portion, a third taper extends along and is formed by the first side and the second side from the first end to the second end between the first taper and the second taper, the first, second, and third tapers forming an angled tip at a distal end, the first, second, and third tapers having different angles; and
an inlet with an inlet aperture, the inlet formed by the first side, the second side, the first end, and the second end, the inlet aperture being angled relative to the distal end, the angled inlet aperture corresponding with the third taper.

2. The irrigation emission device barb of claim 1, wherein the first taper has a first angle approximately 85.00 to 89.00 degrees relative to a lateral axis, the second taper has a second angle approximately 9.1 to 15.1 degrees relative to the longitudinal axis, and the third taper has a third angle approximately 37.0 to 43.00 degrees relative to the longitudinal axis.

3. The irrigation emission device barb of claim 1, further comprising a bottom portion, a first side ledge extending from a bottom of the first side and a second side ledge extending from a bottom of the second side to connect the piercing portion to the bottom portion.

4. The irrigation emission device barb of claim 3, further comprising a neck interconnecting the bottom portion and an external portion including an irrigation emission device.

5. The irrigation emission device barb of claim 1, wherein the piercing portion is configured and arranged to deflect debris and reduce plugging of the inlet aperture.

6. The irrigation emission device barb of claim 5, wherein the inlet aperture is 0.070+/−0.005 inch between the first and second sides by 0.150+/−0.005 inch between the first and second ends and has an angle approximately 37.00 to 43.00 degrees relative to the longitudinal axis.

7. The irrigation emission device barb of claim 1, wherein the first taper extends from the second taper to the first end to form part of the tip.

8. The irrigation emission device barb of claim 1, wherein the third taper extends between the first taper at the first end and the second taper at the second end.

9. The irrigation emission device barb of claim 1, wherein the first and second sides are inset relative to the second taper and ledges interconnect the first and second sides and the second taper.

10. An irrigation emission device including a barb, comprising:
- a piercing portion configured and arranged to pierce an irrigation hose, the piercing portion having a first side, a second side, a first end, and a second end forming a generally rectangular shaped portion, the first end includes a first taper, a second taper forms a generally cone shaped portion between the first end and a bottom of the piercing portion, third taper extends along and is formed by the first side and the second side from the first end to the second end forming a tip at a distal end;
- an inlet with an inlet aperture, the inlet formed by the first side, the second side, the first end, and the second end, the inlet aperture being angled relative to the distal end, the angled inlet aperture corresponding with the third taper;
- a bottom portion, a first side ledge extending from a bottom of the first side and a second side ledge extending from a bottom of the second side to connect the piercing portion to the bottom portion; and
- a neck interconnecting the bottom portion and an external portion including an irrigation emission device.

11. The irrigation emission device of claim 10, wherein the first taper has a first angle approximately 85.00 to 89.00 degrees relative to a lateral axis, the second taper has a second angle approximately 9.1 to 15.1 degrees relative to the longitudinal axis, and the third taper has a third angle approximately 37.0 to 43.00 degrees relative to the longitudinal axis.

12. The irrigation emission device of claim 10, wherein the inlet aperture is formed by the piercing portion.

13. The irrigation emission device of claim 12, wherein the piercing portion is configured and arranged to deflect debris and reduce plugging of the inlet aperture.

14. The irrigation emission device of claim 12, wherein the inlet aperture is 0.070+/−0.005 inch between the first and second sides by 0.150+/−0.005 inch between the first and second ends and has an angle approximately 37.00 to 43.00 degrees relative to the longitudinal axis.

15. The irrigation emission device barb of claim 10, wherein the first taper extends from the second taper to the first end to form part of the tip.

16. The irrigation emission device of claim 10, wherein the first, second, and third tapers have different angles.

17. The irrigation emission device of claim 10, wherein the third taper extends between the first taper and a portion of the second taper and the first, second, and third tapers form an angled tip at a distal end.

18. The irrigation emission device of claim 17, wherein the first, second, and third tapers having different angles.

19. The irrigation emission device barb of claim 10, wherein the first and second sides are inset relative to the second taper and ledges interconnect the first and second sides and the second taper.

* * * * *